Figure 1:
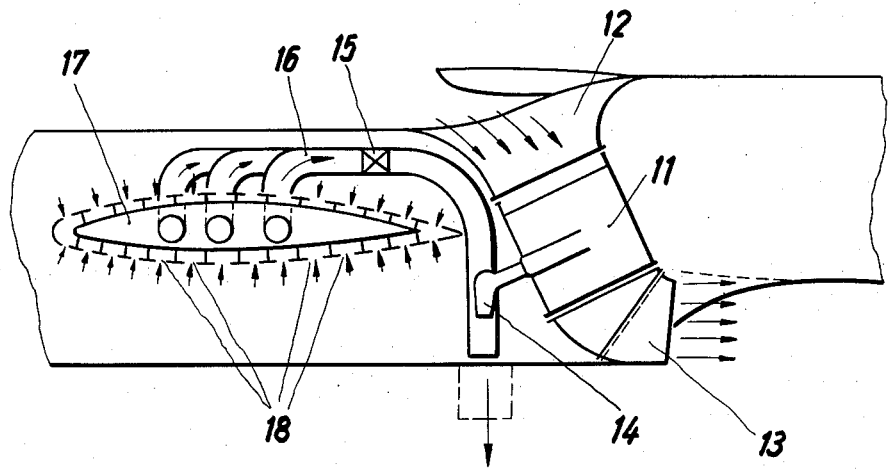

United States Patent
Riccius

[11] 3,801,048
[45] Apr. 2, 1974

[54] METHOD FOR REDUCING DRAG OF VERTICAL TAKEOFF TYPE AIRCRAFT

[75] Inventor: Rolf Riccius, Worpswede, Germany

[73] Assignee: Vereinigte Flugtechnische Werke-Fokker GmbH, Breman, Germany

[22] Filed: June 23, 1971

[21] Appl. No.: 155,837

[30] Foreign Application Priority Data
July 17, 1970 Germany............... P 20 35 445.4

[52] U.S. Cl. ........ 244/42 CE, 244/23 B, 244/42 CC
[51] Int. Cl. ............................................ B64c 21/06
[58] Field of Search............. 244/42 R, 42 C, 42 CC, 244/42 CD, 42 CE, 42 CF, 12 R, 12 B, 12 D, 53 R, 55, 23 B; 60/226

[56] References Cited
UNITED STATES PATENTS

| | | | |
|---|---|---|---|
| 3,012,740 | 12/1961 | Wagner | 244/42 CF |
| 3,291,420 | 12/1966 | Laing | 244/42 CE |
| 3,503,572 | 3/1970 | Hafner | 244/42 R |
| 2,930,544 | 3/1960 | Howell | 244/12 B |

FOREIGN PATENTS OR APPLICATIONS

| | | | |
|---|---|---|---|
| 862,032 | 3/1961 | Great Britain | 244/42 CC |
| 921,013 | 3/1963 | Great Britain | 244/42 CC |

Primary Examiner—Duane A. Reger
Assistant Examiner—Barry L. Kelmachter
Attorney, Agent, or Firm—Smyth, Roston & Pavitt

[57] ABSTRACT

Method of reducing drag on an aircraft of the vertical takeoff variety and having a particular power plant for production of vertical thrust as well as a main engine for producing forward thrust during aerodynamic flight; the vertical thrust producing power plant is used as power source for controlling the boundary layer flow along at least part of the surface of the aircraft during aerodynamic flight, residual thrust of that plant is deflected to contribute to forward thrust, supplementing the forward thrust produced by the main engine.

1 Claim, 2 Drawing Figures

METHOD FOR REDUCING DRAG OF VERTICAL TAKEOFF TYPE AIRCRAFT

The present invention relates to a method for reducing drag and resistance of a vertical takeoff and landing type aircraft, having a power plant for production of vertical thrust as well as suction or blowing equipment for control of boundary layer flow along the outer surface of the craft.

Upon comparing vertical takeoff aircrafts with conventional, horizontal takeoff aircrafts under consideration of generally similar operating conditions (payload, speed, distance range) for both types, one finds that the operating costs for the vertical takeoff craft is higher. This disadvantage results primarily from the fact that the vertical takeoff type plane itself is heavier because additional power equipment is required for the production of vertical thrust. This vertical thrust producing power plant is used during the takeoff only, and is inoperative during regular horizontal flight. Therefore, the vertical thrust producing equipment just reduces the payload and adds to the weight on takeoff. Assuming similar distance range and speed for the two types of aircraft, either the takeoff weight is higher for the same payload, or payload is smaller for similar takeoff weight. This is the particular reason that higher costs are incurred for the operation of vertical takeoff crafts. Generally, this has to do with the fact that for a vertical takeoff plane, payload, speed and range being similar, a larger surface is exposed to drag producing flow. Therefore, there is a larger aerodynamic resistance and that, in turn, results in larger fuel consumption and higher operation cost.

Construction of aircraft is known which provides suction or blowing along the wings to influence the boundary layer flow in such a manner that drag is reduced while providing additional lift. For blowing against the boundary layer along the lift producing surface, usually slots are provided on the top surface of the wing, right behind the leading edge, as well as in front of the rear edge flaps. These slots run longitudinally across the wing, and pressurized air is blown through these slots. The required pressure is usually taken from behind the compressor stage in the jet engine, or compressors are provided just for that purpose.

Suction operates in that a large part of the skin of the aircraft is perforated, and the boundary layer is sucked into these openings. The required low pressure is provided by a suction pump which also in this case is provided for just that purpose.

It can be seen that both methods, blowing and suction, attempt to prevent a change from laminar to turbulent flow in critical areas along the surface. Also, separation of the lift producing flow is avoided in particular surface areas. This way aerodynamic drag can be reduced. Equipment of this variety is disclosed, for example, in German printed U.S. Pat. application No. 1,531,422. Disclosing particular boundary layer control along the fuselage; the power for operating suction or blowing equipment is provided either by the dual cycle jet propulsion engine or by additional, separately driven suction equipment. Nevertheless, the boundary layer control extracts power from the power plant. In the case of taking compressed air from the engine and power plant that produces the forward thrust, for purposes of blowing the boundary layer, the effective power output of that plant, and its efficiency for developing forward thrust, is significantly reduced. Therefore, the efficiency is reduced correspondingly. If supplemental blowing or suction equipment is provided, e.g. compressors or pumps, the weight of the aircraft is increased accordingly. It can, thus, be seen that in all cases the gain resulting from drag reduction through boundary layer control is significantly reduced either by that additional weight or by reduced efficiency of the engine or both.

It is an object of the present invention to improve the economy of vertical takeoff type aircraft, particularly by reducing aerodynamic drag. In accordance with the present invention, this problem is solved in that the power and energy needed for operating suction or blowing equipment is taken from that part of the power equipment that provides vertical thrust during takeoff or landing, but is not used for that purpose during the aerodynamic phase of horizontal flight. As not all of the power output of the vertical thrust producing plant is needed for boundary layer control, the residual thrust is deflected to supplement and to contribute to forward thrust.

It can, thus, be seen, that the vertical thrust producing equipment is put to use during all phases of the flight, and is no longer inoperative during regular cruising, but operates blowing or suction equipment. Therefore, it is a principle of this invention to put to use a power plant which remained previously unused during regular cruising, to serve for drag reduction and to provide additional forward propulsion. This way, operating cost is reduced, and the economy of operation of such a vertical takeoff plane, as compared with regular, horizontal takeoff plane, is considerably improved. The inventive method proves to be particularly advantageous, if comparison is made on basis of similar cruising speeds, and payload for large distance ranges. It was found that particularly for long distance flights, the drag reduction results actually in a gain, evidenced by lower total fuel consumption than for a conventional plane.

Figure 2:
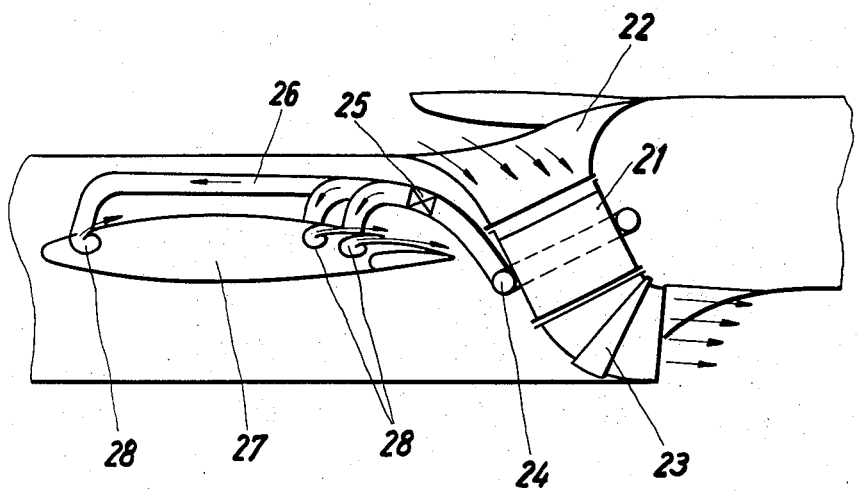

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 illustrates somewhat schematically a cross section through part of an aircraft, showing improvement in accordance with the preferred embodiment of the invention, for boundary layer suction; and FIG. 2 shows a similar view of a basically similar improvement but for boundary layer blowing.

Proceeding now to the detailed description of the drawings in FIG. 1, there is illustrated suction equipment for a vertical takeoff type of plane having a particular, vertical thrust producing power plant and engine 11 for lifting the aircraft during takeoff. The thrust producing engine 11 is in the fuselage 10 and sucks required air through an intake 12. The jet flow is not shown for takeoff, but the exhaust jet is shown as being deflected by a deflecting device 13 to leave the aircraft below and along the fuselage during aerodynamically supported flight, when the plane propagates substantially in the horizontal direction. The air and exhaust gas jet adds to the propulsion as provided by regular engines (not shown), and provides additional forward thrust accordingly.

In the particular example shown in FIG. 1, there is suction provided through the surface of the wing 17. Of course, it is readily apparent that suction can also be provided all along the fuselage. In particular, the wing 17 has a perforated outer skin, there are provided numerous openings 18 accordingly. The openings 18 are in communication with a suction pipe and conduit system 16 under control of one or several valves 15. The power for operation of the suction device is taken from the vertical thrust producing engine 11. In particular, pressurized air is taken from the compressor stages of power plant 11, and suction is produced by operation of ejector effect of a jet pump 14 positioned downstream in the conduit system 16. Thus, ejector 14 produces the required low pressure which causes suction flow of air through perforations in wing 17. This way, boundary layer turbulence and separation is avoided.

Now, during vertical takeoff, as well as during hovering phases, such drag reduction is not needed. Therefore, operation of the suction device is not required and valve 15 separates the suction load from the lift producing, vertical thrust plant 11. As soon as there is a transition from lift to horizontal aerodynamic flight, valve 15 is opened, and plant 11 will now operate primarily as pump to suck the boundary layer along the wing to the skin thereof. Additionally deflectors 13 have been placed to the illustrated position, so that the exhaust of engine 11 provides additional forward thrust. Aside from inevitable losses due to the deflection, the power of the plant 11 supports the forward thrust to the extent that it develops more power than needed for suction.

The embodiment shown in FIG. 2 is similar to some extent to FIG. 1, as far as using the lift-producing vertical thrust developing engine and plant 21 is concerned. However, there are two differences, the boundary layer on top of the wing is subjected to blowing, and blower power is extracted from engine 21. The engine 21 is similar to engine 11; air enters intake 22 and through deflector 23 the exhaust jet changes direction for producing horizontal thrust during normal flight. The plant 21 provides also the required pressure needed for boundary layer control.

The wing 27 has several slots 28. There is a first one close to the leading edge of the wing while two others are provided close to the rear edge flaps. These slots run in parallel respectively to the front and rear edges of the wings. Slots 28 are connected to a duct system 26, running from the wing to the fuselage (transverse to the plane of the drawing), and in the fuselage to an annular pressure collecting chamber 24 that is in communication with engine 21. The duct system 26 is under control of a closing valve 25.

Upon opening valve 25, duct system 26 is in communication with the air pressure collection chamber 24, extracting blower pressure from engine 21. Therefore, during normal flight, air is blown into the duct and conduit system 26 and discharged through slots 28, to blow against the boundary layer on top of the wing. During the vertical takeoff phase the duct system 26 is closed by valve 25, so that pressure is not extracted from the then vertical thrust producing plant 21.

In the two examples shown in FIGS. 1 and 2, there is provided a means for powering control of boundary layer flow on the wing, taking the required energy from the respective vertical lift producing plant. The vertical lift producing plant is not required to produce vertical lift during horizontal flight and, therefore, can be used for drag reducing boundary layer control. It should be mentioned that the lift producing plant itself can be of any construction and does not have to be a regular lift jet engine as it can also be a thrust producing lift fan. Moreover, it should be mentioned that the conduit system, providing low or high pressure as the case may be, may be extended to run along the skin of fuselage, and there may be perforations or slots in the fuselage in order to provide boundary layer control there along.

The invention is not limited to the embodiments described above but all changes and modifications thereof not constituting departures from the spirit and scope of the invention are intended to be included.

I claim:

1. Method of reducing drag of an aircraft of the vertical takeoff variety and having main engine means for producing forward thrust during aerodynamic flight and having a power plant, separately from the main engine means, for production of vertical thrust, comprising the steps of using an ejector pump for extracting suction power from the vertical thrust producing power plant; controlling the boundary layer flow along at least part of the surface of the aircraft during aerodynamic flight, without affecting the main engine means, by using the suction power as extracted by the ejector pump for sucking air through said surface part; and providing concurrently exhaust jet deflection in the vertical thrust providing power plant to contribute to forward thrust by supplementing the forward thrust provided by the main engine means.

* * * * *